United States Patent [19]

Costanzo et al.

[11] Patent Number: 5,149,013
[45] Date of Patent: Sep. 22, 1992

[54] RETRACTABLE HELICOPTER ROTOR

[75] Inventors: Ralph D. Costanzo, Monroe; Robert J. Durwin, Trumbull; Lee N. Hager, Southbury; William L. Noehren, Trumbull, all of Conn.

[73] Assignee: United Technologies Corporation, Hartford, Conn.

[21] Appl. No.: 701,257

[22] Filed: May 16, 1991

[51] Int. Cl.⁵ .............................................. B64C 27/32
[52] U.S. Cl. ................................ 244/17.11; 244/7 R; 416/142
[58] Field of Search .................. 244/17.11, 17.27, 7 R; 416/142, 149, 150, 114

[56] References Cited

U.S. PATENT DOCUMENTS

| | | | |
|---|---|---|---|
| 2,792,189 | 5/1957 | Altemus | 244/7 R |
| 2,981,339 | 4/1961 | Kaplan | 416/142 |
| 3,050,277 | 8/1962 | Katzenberger et al. | 244/7 R |
| 3,912,199 | 10/1975 | Seibel et al. | 416/142 X |
| 3,972,491 | 8/1976 | Ferris et al. | 244/17.27 |
| 4,131,392 | 12/1978 | Barzda | 416/142 |

*Primary Examiner*—Joseph F. Peters, Jr.
*Assistant Examiner*—Carla Mattix
*Attorney, Agent, or Firm*—Vernon F. Hauschild

[57] ABSTRACT

A retractable helicopter rotor in which the rotor and its blades, the swashplate and the pitch change rods are retracted and extended as a unit during the helicopter rotor retraction/extension mode of operation, wherein the connection between the rotor support system and the fuselage constitutes a single interface between overlapping circumferentially extending flanges of each, and with the bolts joining those flanges being loaded in compression.

7 Claims, 4 Drawing Sheets

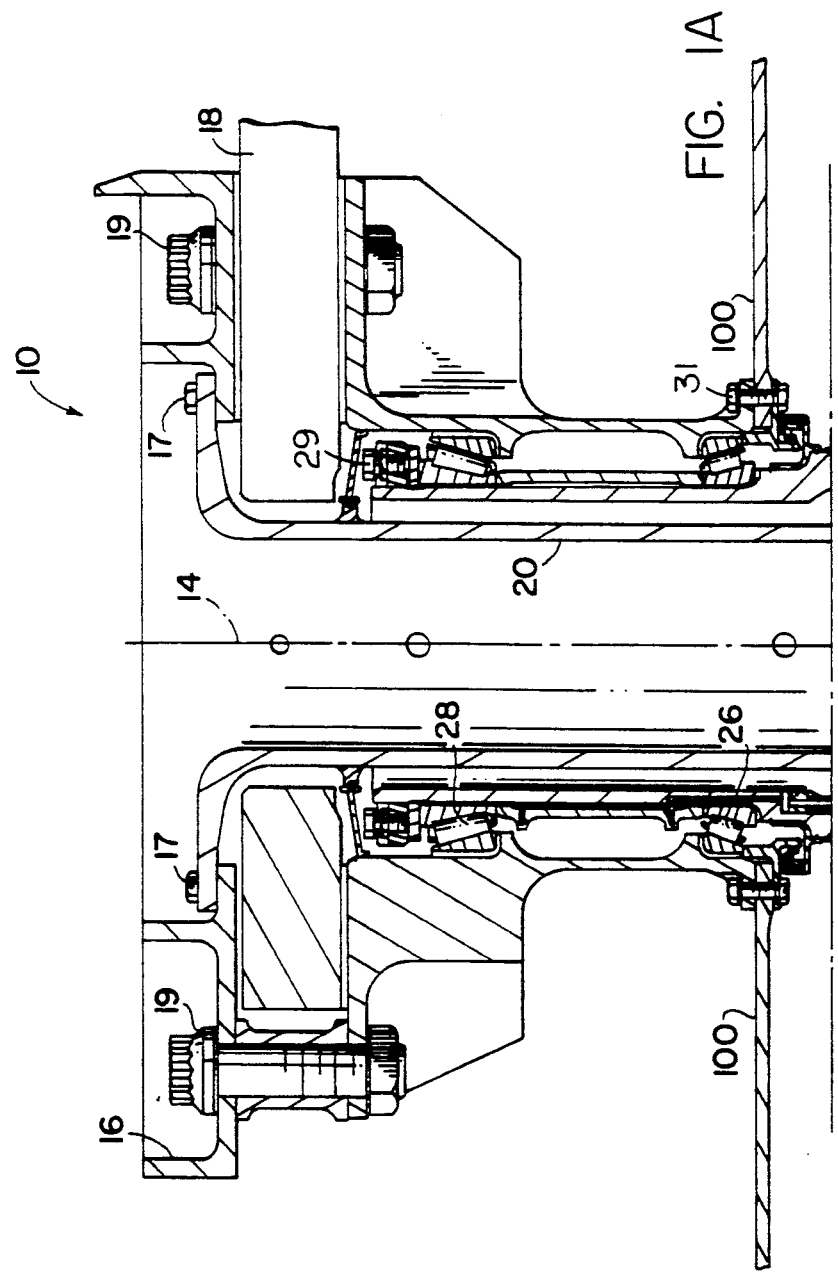

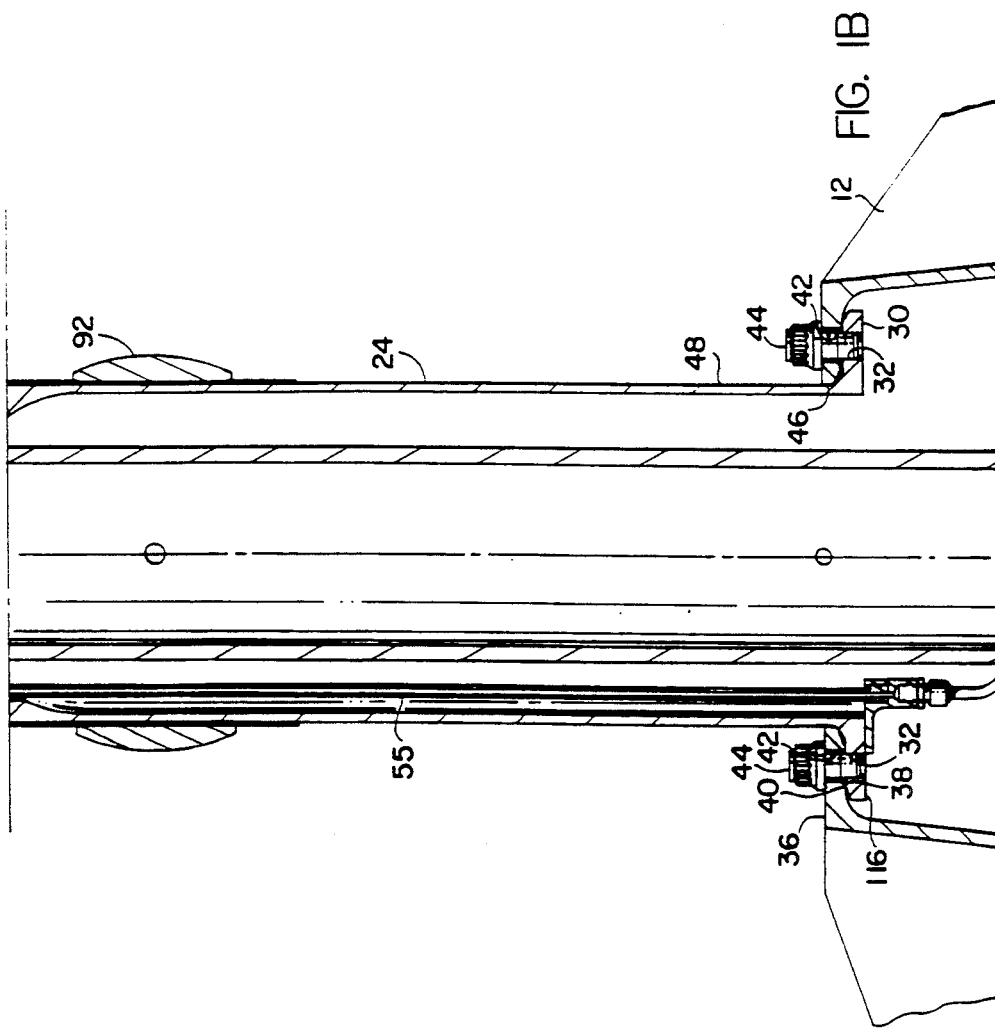

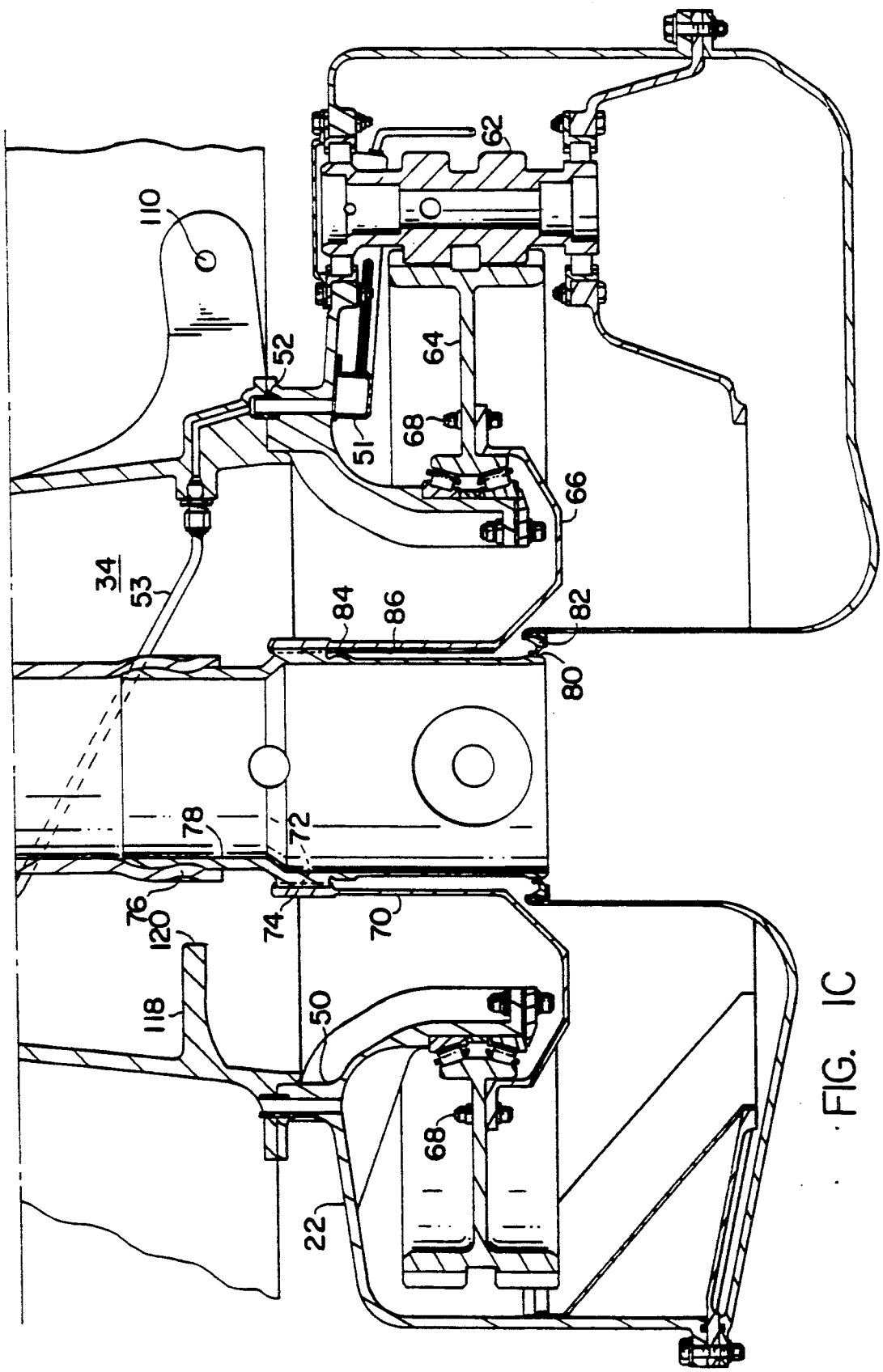
FIG. IC

RETRACTABLE HELICOPTER ROTOR

This invention was made with Government support under Contract DAAJ09-89-C-A002 awarded by the Department of the Army. The Government has certain rights in this invention.

This application contains similar material to an application filed on May 16, 1991 identified as U.S. patent application Ser. No.07/701,256 entitled "Helicopter With Retractable Rotor For Transport" and invented by L. J. Doolin et al (5-4383).

TECHNICAL FIELD

This invention relates to helicopters and more particularly to helicopters having rotors which are movable between an extended, operable flight position in which they are a sufficient distance above the helicopter fuselage so that the coaction therebetween does not establish vibration and aerodynamic drag, and a retracted position close to the fuselage in which the helicopter is transportable within a vehicle, such as a larger aircraft, an aircraft carrier, or a land vehicle.

BACKGROUND OF THE INVENTION

In the helicopter field, there have been retractable helicopter rotors, however, these prior art constructions added substantial weight to the helicopter and required substantial disassembly of parts to move the helicopter rotor from its extended position to its retracted position, and substantial assembly work to move the helicopter from its retracted position to its extended position. U.S. Pat. No. 3,972,491 granted on Aug. 3, 1976 to Donald L. Ferris et al discloses a two-position main rotor wherein the rotor is supported for rotation about an axis by an extension shaft which is, in turn, supported from the main rotor drive shaft through projections from the helicopter fuselage.

In the flight mode of operation, the extension shaft is connected at one end to the main rotor hub via a first series of fasteners and connected at the other end of the main rotor shaft by a second series of fasteners. As such, the configuration taught by Ferris et al requires the disengagement of both upper and lower fasteners to move the rotor from its extended to its retracted position and reengagement of those fasteners to move the rotor from its retracted to its extended position. Further, these fasteners and their associated hardware impose weight penalties upon the helicopter. The Ferris et al construction also requires connection and disconnection of the helicopter pitch change rods.

To put the Ferris et al construction back into flight mode, it is not only necessary to reassemble all of the parts disassembled during the operation of retracting the rotor, but also reconnecting the pitch change rods and re-rigging the controls which then requires a test flight to verify that proper adjustments have been achieved.

DISCLOSURE OF THE INVENTION

Therefore, it is an object of this invention to provide a construction in which the helicopter rotor is movable between an extended, flight operational position and a retracted, transport or stowage position which requires no additional hardware which would impose a weight penalty upon the helicopter, and in which the rotor, swashplate and pitch change rods are moved as a unit so that disconnection, reconnection, and calibration of the pitch change rods re-rigging the controls and flight testing the helicopter is not necessary.

It is a further object of this invention to provide a retractable helicopter rotor wherein the helicopter rotor mount facilitates retraction and extension, reacts vertical lift loads through a structural interface, and reduces weight penalties. Our invention utilizes a single interface for connecting the rotor hub to its support mechanism and loads the fastener connection at that interface in compression, and reacts lift loads through a shoulder interface.

It is still a further object of this invention to teach such a retractable helicopter rotor which reduces the number and mass of structural interfaces and enhances the structural efficiency resulting in reduced weight and improved reliability.

It is still a further object of this invention to teach such a retractable rotor in which during the rotor retraction and extension operation, the rotor is maintained in proper position with respect to its drive mechanism, thereby avoiding the necessity for removing the rotor drive shaft prior to lowering the rotor to the retracted position. This requires the removal of the connecting bolts prior to removal of the rotor drive shaft. After the rotor has been lowered to the retracted position, the rotor drive shaft would then have to be reinstalled with the need to insert the spline teeth of the rotor drive shaft into the spline teeth of the output quill shaft while aligning the bolt hole between the rotor drive shaft and hub.

It is still a further object of this invention to teach such a retractable helicopter rotor in which the support structure for the helicopter rotor performs a pilot function as the rotor and swashplate mechanisms are retracted and extended in unison.

It is still a further object of this invention to teach such a retractable helicopter rotor which includes provisions for sealing between the rotor drive shaft and the transmission at both the rotor extended and retracted positions, and which sealing mechanism adds no friction forces to the system when the helicopter rotor is between these two positions during the rotor extension or retraction operations.

It is still a further object of this invention to teach such a retractable helicopter rotor in which the support connection between the helicopter fuselage and the helicopter rotor consists of overlapping ring flanges which are concentric about and extend substantially perpendicular to the rotor axis of rotation, with the ring flange which is attached to the rotor positioned inwardly of the ring flange which is attached to the fuselage, and in which the connection therebetween is made by a series of bolts which are loaded in compression during the flight operation of the helicopter.

Other objects, features and advantages of the invention will become apparent in light of the following description thereof.

BRIEF DESCRIPTION OF THE DRAWINGS

FIG. 1, which is shown on three pages as FIGS. 1A, 1B and 1C, is a side view of our retractable helicopter rotor, partially broken away and partially in cross-section, for purposes of illustration.

BEST MODE FOR CARRYING OUT THE INVENTION

Figure 2:
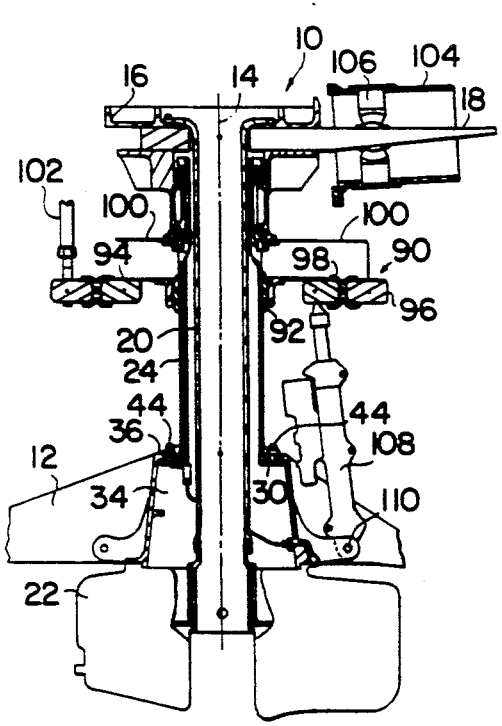
FIG. 2 corresponds to FIG. 1, and shows the rotor and its associated hardware in its extended, operational flight position.

Referring to FIG. 1, we see helicopter rotor 10 which is supported from fuselage support platform 1 for rotation about axis of rotation 14. Helicopter rotor 10 comprises rotor hub 16 which carries in conventional fashion a plurality of radially extending blades 18 which are supported therefrom for rotation therewith and for lead/lag, flapping and pitch change motion with respect thereto. Blades 18 are supported from hub 16 by connecting bolts 19. Rotor 10 is driven in rotation by rotor drive shaft 20, which is connected to and is driven by engine driven transmission 22 in a fashion to be described hereinafter. Rotor drive shaft 20 is circular in cross-section, generally cylindrical in shape, and concentric about axis 14.

Rotor mast or standpipe 24, which is circular in cross-section, cylindrical in shape, and concentric about axis 14, is supported from support platform 12 at its axially inner end and connects to rotor hub 16 through preload bearing 26 and main thrust bearing 28 and connecting bolts 17.

The axially inner end of mast 24 terminates in ring flange 30 which is concentric about axis 14 and extends in a direction substantially perpendicular thereto. Ring flange 30 has a circumferential array of threaded bolt holes 32 extending therethrough in parallel relationship to axis 14.

While bearings 26 and 28 could be lubricated by grease packings, we prefer to bring oil from transmission 22 through manifold 51 and flexible tubing 53 into transfer tube 55, which carries the lubricant to both of these bearings 26 and 28.

Mast 24 is supported from support platform 12, which is in turn supported from the helicopter fuselage. Support platform 12 defines cavity 34 which communicates with the interior of the housing of transmission 22 and rotor drive shaft 20. At its axially outer end, support platform 12 terminates in ring flange 36, which is concentric about axis 14 and extends substantially perpendicular thereto, and has an axially inner flat surface 38, which matingly engages axially outer flat surface 40 of flange 30 in flush relationship. Flange 36 has a circumferential array of bolt holes 42 therein, which align with bolt holes 32 of flange 30 and receive connecting bolts 44 to join flanges 30 and 36 and thereby support mast 24 from support platform 12. Flanges 30 and 36 are preferably interrupted circumferentially so that the positions of flanges 30 and 36 are aligned to receive bolts 44 during operation, but flanges 30 and 36 can be brought out of alignment with bolts 44 removed to permit disassembly of mast 24 from platform 12.

It is an important feature of our invention that with this construction, the lift loads imposed by the rotor lift forces acting upon support platform 12 are across the shoulder interface between flange surfaces 38 and 40, and serve to load connecting bolts 44 in compression.

Figure 3:
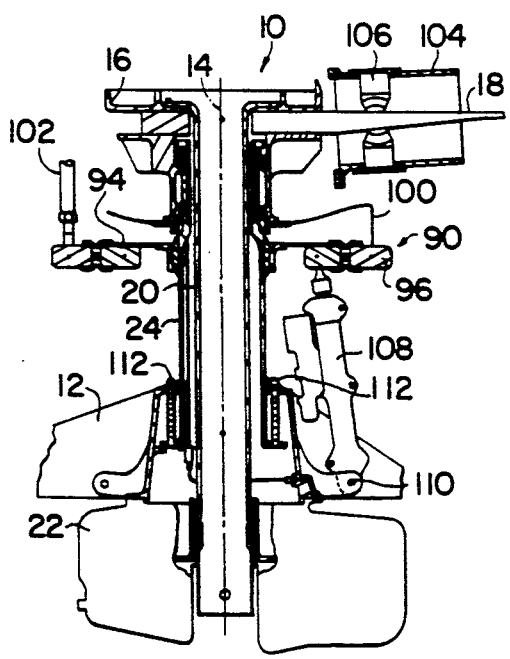
FIG. 3 corresponds to FIGS. 1 and 2, but shows the helicopter rotor in its retracted, transport or stowage position.

It is also an important feature of this invention that the minimum diameter surface 46 of flange 36 engages pilot diameter 48 of mast 24 in close relationship so that support 12 serves to pilot mast 24 concentrically about axis 14 as the helicopter rotor moves between its extended, flight operational position shown in FIGS. 1 and 2 and its retracted position shown in FIG. 3.

Support platform 12 is connected to the housing 50 of transmission 22 by a plurality of nut and bolt connections shown at 52.

As stated earlier, rotor drive shaft 20 and, hence, rotor 10 is driven in rotation about axis 14 by splined output shaft 66 of main transmission 22 which is preferably driven by a three stage reduction gear arrangement driven by an engine or engines (not shown).

As best shown in FIG. 1c, which shows a portion of transmission 22, gear 62 drives bullgear 64 about axis 14. Output quill 66 is connected to bullgear 64 by connecting bolts 68 for rotation therewith about axis 14. Output quill 66 includes cylindrical section 70, which is of circular cross-section and concentric about axis 14 and extends therealong terminating at axially outer end in inner diameter spline 72. Spline 72 matingly engages outer diameter spline 74 which is carried by rotor drive shaft 20 near its inner end so as to be integrally connected thereto or, as shown in FIG. 1c, to be connected as a separate metal fitting 78 to composite drive shaft 20 through bonded interface connection 76 which permanently joins the composite drive shaft 20 to the metal fitting 78 by resin bonding at the mating surfaces and also achieves a physical interlock by the mechanical capture of the metal fitting by means of filament winding or braiding which wraps about the circumferential grooves and lobes of fitting 78.

It will be noted that rotor drive shaft 20, or the connection 78 thereto, extends axially inwardly from connection 76 and defines outer diameter spline 74 which matingly engage inner diameter spline 72 of quill 66 when rotor 10 is extended, and terminates in raised cylindrical surface 80, which engages ring or lip seal 82 when rotor 10 is in its extended flight position so as to form a seal between the interior of transmission housing 50 and cavity 34 within support platform 12. Drive shaft 20, or attachment 78 thereto, also includes raised cylindrical surface 84, which serves to engage seal 82 when the rotor is in its retracted position so that seal 82 serves as a seal between the transmission housing and the interior of support platform 12 when the rotor is in both its extended and retracted positions. It should be noted, however, that there is no contact between seal 82 and raised members 80 and 84 during the rotor extension or retraction operation so that the seal is not imposing friction loads which would impede rotor motion.

It will therefore be seen that motor driven transmission 22, due to the spline connection between output quill 66 and rotor drive shaft 20, or rotor drive shaft attachment 78, serves to drive rotor drive shaft 20 and, hence, rotor 10 in rotation about axis of rotation 14 at a reduced speed from that imparted to transmission 20 by first stage input gear 62.

It is important to note that output quill 66 also includes at least one, and preferably about three axially extending alignment splines 86, which are equally circumferentially spaced and extend axially along and for the full length of cylindrical portion 70 of quill 66, so that splines 74 of drive shaft 20, or attachment 78 thereto, remain in engagement with axial alignment splines 86 at all times during the rotor retraction or extension operation. This avoids the necessity for realigning the rotor with the transmission, which would be the case if splines 86 were not continuously performing their rotor-to-transmission alignment retention function.

As best shown in FIG. 2, rotor swashplate 90 envelops mast 24 and comprises uniball 92 mounted on the pilot surface 48 of mast 24 for translation along axis 14. Swashplate 90 further includes stationary swashplate ring 94 and rotating swashplate ring 96. Swashplate rings 94 and 96 are connected by ring bearings 98. Ring 96 is connected to rotor hub 16 by flexible scissors 100 so that the action of scissors 100 is to cause ring 96 to rotate about axis 14 with rotor hub 16. Flexible scissors may be of the type disclosed in U.S. patent application Ser. No. 07/508,204 by Hunter et al, filed Apr. 11, 1990, and assigned to assignee of this application.

Outer ring 96 carries a series of pitch change rods 102 with one such pitch change rod connected to the pitch change horn (not shown) which project from torque tube 104, which is supported from blade 18 by snubber 106 such that motion of swashplate 90 acts upon pitch change rods 102 to cause torque tube 104 and, hence, blade 18 to change pitch as called for by the pilot or the control.

Hydraulic servos, such as 108, preferably at least three in number, are pivotally connected at pivot point 110 to support platform 12, and are pivotally connected at their opposite ends to stationary ring 94 of swashplate 90. Hydraulic servos 108 are controllably actuated to cause swashplate 90 to translate axially along axis of rotation 14 to cause blades 18 to change pitch collectively, or to cause swashplate 90 to tilt with respect to axis 14, thereby imparting cyclic pitch changes to blades 18, or to produce combinations of collective and cyclic pitch.

It is an important feature of our invention that pitch change rods 102 and servos 108 do not have to be disconnected when our rotor is being moved between its FIGS. 1 and 2 extended position and its FIG. 3 retracted position. This is a substantial advantage in that if the pitch change rods 102 had to be disconnected, it would then be necessary to reconnect each pitch change rod 102 to a pitch change horn when the hub 10 is returned to its extended flight position. In addition, the axial length of each rod and of each pitch change rod would have to be adjusted in accordance with rigging procedure to obtain the proper tracking of the path of each blade when rotating about axis 14. This would also require a test flight to verify proper adjustment.

Further, if it were necessary to disconnect hydraulic servos 108, we would encounter the disadvantage of having to reconnect each hydraulic servo 108 to the stationary ring 90 of the swashplate 94 when the hub is return to the extended flight position. The axial length of the rod end of each hydraulic servo 108 would have to be adjusted in accordance with rigging procedure to obtain the correct cyclic (tilting) collective (axial) motions of the hub 10. This also requires a test flight to verify that the proper adjustment has been achieved.

Figure 4:
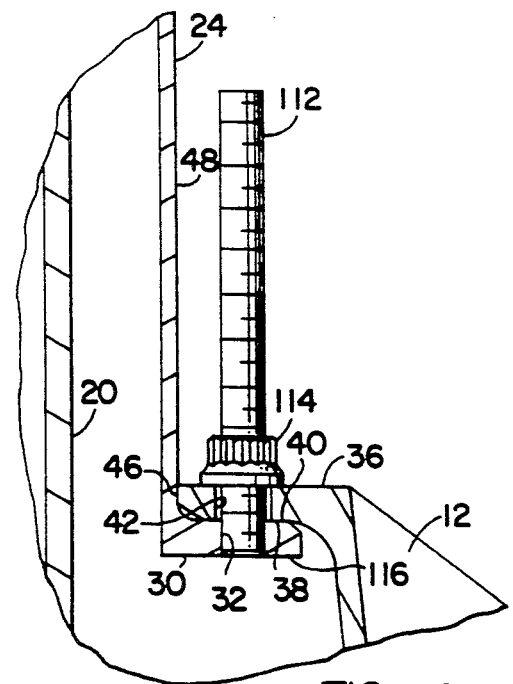
FIG. 4 is a showing of one of the jackscrews used to effect rotor retraction an extension.

Viewing FIGS. 1 and 2, we see rotor 10 in its extended, flight operation position. When it is desired to retract the rotor to its retracted position, shown in FIG. 3, some of the connecting bolts 44, possibly three equally circumferentially spaced connecting bolts 44, are removed for this purpose. Jackscrews 112, shown in FIG. 4, are threaded and include nut 114 threaded thereonto. Threaded jackscrews 112 are caused to threadably engage threads 32 of the bolt holes in flange 30 and then, by selectively rotating nuts 114 causing the mast 24, swashplate 90, rotor hub 16, and blades 18 to selectively retract into the FIG. 3 position at which time the axially inner surface of flange 30 abuts the axially upper surface 118 of positive stop ring 120 that is integral to support platform 12.

Having thus described a typical embodiment of the invention, that which is claimed as new and desired to be secured by Letters Patent of the United States is:

1. A helicopter having a fuselage and a rotor which is movable between an extended, flight operational position and a retracted position including:
   (a) means to support the rotor from the fuselage for rotation about an axis of rotation including:
      (1) a support platform fixedly supported from the fuselage and including a ring shaped flange positioned concentrically and in spaced relationship about the rotor axis of rotation and extending substantially perpendicular thereto;
      (2) a normally fixed mast member of circular cross-section positioned concentrically about the rotor axis of rotation and having a ring flange at its axially inner end which abuts the axially inner side of the support platform ring flange and is fixedly connected thereto by a series of bolts extending through a circumferential array of aligned bolt holes in the flanges; and
      (3) means connecting the upper end of the mast member to the rotor so as to support the rotor from the mast member for rotation about the axis of rotation;
   (b) a transmission positioned within a housing located inwardly of the mast member; and having
      (1) an output quill connected to and mounted for rotation with the transmission and including a cylindrical portion positioned concentrically about the rotor axis of rotation and having a ring of splines positioned circumferentially about the axis of rotation and extending in a direction axially therealong, and further having at least one axially extending alignment spline which extends substantially the full length of the output quill cylindrical portion;
   (c) a rotor drive shaft of substantially circular cross-section and positioned concentrically about the rotor axis of rotation and having:
      (2) an inner end which is cylindrical in cross-section and positioned concentrically about the axis of rotation and including:
         (a) a circumferential array of splines which operatively engage the splines of the transmission output quill so as to operatively connect the rotor drive shaft and, hence, the rotor to the transmission to be driven thereby during rotor extended flight operation; and
   (d) means to lower the mast with the rotor attached thereto inwardly along the axis of rotation when the connecting bolts between the abutting flanges of the support platform and the mast are removed so that the rotor is thereby moved form its extended flight operational position to a retracted position and so that the rotor is prevented from rotating during the retracting motion due to the continuous engagement between the rotor drive shaft splines and the output quill alignment spline, said transmission output quill alignment spline serving to maintain continuous spline alignment between the output quill and rotor drive shaft while the hub is being lowered to the retracted position or being raised to the extended flight position and operatively engages the rotor drive shaft splines when in the extended flight position.

2. A helicopter according to claim 1 wherein said support platform ring flange has an inner diameter slightly larger than the outer diameter of the mast member so as to serve as a pilot for the mass member during the rotor retraction and extension motion of the mast member and rotor.

3. A helicopter according to claim 2 and including means to effect sealing between the interior of the transmission and the rotor drive shaft when the rotor drive shaft is in both its extended and retracted positions.

4. A helicopter according to claim 3 and including a swashplate enveloping said mast member and mounted to be translatable axially therealong and tiltable with respect thereto, blade member forming part of said rotor for rotation therewith and having pitch change horns, pitch change rods extending from the swashplate to the pitch change horn of each blade so that motion of the swashplate will vary blade pitch, and so that during rotor retraction the helicopter rotor with blades, the mast member, the swashplate, and the pitch change rods while still connected to the blades and swashplate are collectively retracted as a unit.

5. A helicopter according to claim 1 wherein said lowering means are a series of jackscrews operatively engaging and cooperating with the bolt holes of the support platform and mast member flanges.

6. A helicopter according to claim 4 and including positive stop means to limit the travel of the rotor and mast member at its full retracted position.

7. A helicopter having a fuselage and a rotor which is supported for rotation about an axis of rotation and which is movable between an extended, flight operational position and a retracted position including:

(a) a transmission positioned within a housing located inwardly of the rotor, and having:
  (1) an output quill connected to and mounted for rotation with the transmission and including a cylindrical portion positioned concentrically about the rotor axis of rotation and having a ring of splines positioned circumferentially about the axis of rotation and extending in a direction axially therealong, and further having at least one axially extending alignment spline which extends substantially the full length of the output quill cylindrical portion;
(b) a rotor drive shaft of substantially circular cross-section and positioned concentrically about he rotor axis of rotation and having:
  (1) an outer end operatively connected to the rotor;
  (2) an inner end which is cylindrical in cross-section and positioned concentrically about the axis of rotation and including:
    (a) a circumferential array of splines which operatively engage the splines of the transmission output quill so as to operatively connect the rotor drive shaft and, hence, the rotor to the transmission to be driven thereby during rotor extended flight operation;
(c) means to support the rotor from the fuselage for rotation about an axis of rotation including:
  (1) a support platform fixedly supported from the fuselage and including a ring shaped flange positioned concentrically and in spaced relationship about the rotor axis of rotation and extending substantially perpendicular thereto,
  (2) a normally fixed mast member of circular cross-section positioned concentrically about the rotor axis of rotation, having a ring flange at its axially inner end which abuts the axially inner side of the support member ring flange and is fixedly connected thereto by a series of bolts extending through a circumferential array of aligned bolt holes in the flanges and
  (3) means connecting the upper end of the mast member to the rotor so as to support the rotor form the mast member for rotation about the axis of rotation;
(d) a swashplate enveloping said mast member and mounted to be translatable axially therealong and tiltable with respect thereto;
(e) blade members forming part of said rotor for rotation therewith and having pitch change horns;
(f) pitch change rods extending from the swashplate to the pitch change horn of each blade so that motion of the swashplate will vary blade pitch; and
(g) means to cause said rotor, blades, swashplate and pitch change rods to move as a unit and while fully assembled between an extended position and a retracted position when the rotor is in rotor retract/extend mode when the mast member flange and the support member flange are disconnected, said transmission output quill alignment spline operatively engaging the rotor drive shaft splines to assure a particular axial motion of the rotor drive shaft as it moves between its retracted and extended positions.

* * * * *

UNITED STATES PATENT AND TRADEMARK OFFICE
CERTIFICATE OF CORRECTION

PATENT NO. : 5,149,013

DATED : September 22, 1992

INVENTOR(S) : RALPH D. COSTANZO ET AL

It is certified that error appears in the above-identified patent and that said Letters Patent is hereby corrected as shown below:

```
Claim 1, column 6, line 40, following "having:" insert,
            as the first subparagraph of (c),
            --(1) an outer end operatively connected
            to the rotor;--
```

Signed and Sealed this

Sixteenth Day of November, 1993

Attest:

BRUCE LEHMAN

Attesting Officer

Commissioner of Patents and Trademarks